(12) United States Patent
Gassewitz et al.

(10) Patent No.: US 8,248,940 B2
(45) Date of Patent: Aug. 21, 2012

(54) METHOD AND APPARATUS FOR TARGETED CONTENT DELIVERY BASED ON INTERNET VIDEO TRAFFIC ANALYSIS

(75) Inventors: Mike Gassewitz, Ottawa (CA); Denny Lee, Ottawa (CA); Rob Gaudet, Carp (CA)

(73) Assignee: Alcatel Lucent, Paris (FR)

( * ) Notice: Subject to any disclaimer, the term of this patent is extended or adjusted under 35 U.S.C. 154(b) by 631 days.

(21) Appl. No.: 12/010,803

(22) Filed: Jan. 30, 2008

(65) Prior Publication Data

US 2009/0190473 A1   Jul. 30, 2009

(51) Int. Cl.
G06F 15/16 (2006.01)
H04N 7/025 (2006.01)
(52) U.S. Cl. ............................ 370/235; 709/217; 725/35
(58) Field of Classification Search .......... 370/229–235, 370/253, 259; 709/217–219; 725/34, 35, 725/46, 58, 61, 87, 116, 131, 134
See application file for complete search history.

(56) References Cited

U.S. PATENT DOCUMENTS

| | | | | |
|---|---|---|---|---|
| 5,974,451 | A * | 10/1999 | Simmons | 709/218 |
| 6,029,045 | A * | 2/2000 | Picco et al. | 725/34 |
| 6,463,585 | B1 * | 10/2002 | Hendricks et al. | 725/35 |
| 2001/0032240 | A1 * | 10/2001 | Malone et al. | 709/203 |
| 2002/0129368 | A1 * | 9/2002 | Schlack et al. | 725/46 |
| 2002/0188694 | A1 * | 12/2002 | Yu | 709/218 |
| 2003/0093792 | A1 * | 5/2003 | Labeeb et al. | 725/46 |
| 2003/0149975 | A1 * | 8/2003 | Eldering et al. | 725/34 |
| 2005/0097559 | A1 * | 5/2005 | He | 718/104 |
| 2005/0097599 | A1 * | 5/2005 | Plotnick et al. | 725/32 |
| 2006/0212353 | A1 * | 9/2006 | Roslov et al. | 705/14 |
| 2007/0022442 | A1 * | 1/2007 | Gil et al. | 725/62 |
| 2007/0022459 | A1 * | 1/2007 | Gaebel et al. | 725/114 |
| 2008/0092155 | A1 * | 4/2008 | Ferrone et al. | 725/9 |
| 2008/0140525 | A1 * | 6/2008 | Lamsfuss et al. | 705/14 |
| 2009/0049469 | A1 * | 2/2009 | Small et al. | 725/35 |
| 2009/0132355 | A1 * | 5/2009 | Begeja et al. | 705/14 |

* cited by examiner

*Primary Examiner* — Chi Pham
*Assistant Examiner* — Prince A Mensah
(74) *Attorney, Agent, or Firm* — Kramer & Amado P.C.

(57) ABSTRACT

A system and related method for targeted content delivery based on Internet video traffic analysis, including one or more of the following: a packet-based communication network in communication with a terminal device, the packet-based communication network 1) collecting and comparing traffic flows between the terminal device and one or more video content sources to known protocol signatures, 2) identifying match(es), 3) identifying, monitoring and analyzing a flow sequence of video content information for the match(es), 4) identifying and extracting associated metadata, and 5) harmonizing the metadata; a behavior analyzer that formulates a behavioral profile of a user of the terminal device who requests and receives the video content information; and a targeted content delivery infrastructure that establishes behavioral profile data regarding the user and delivers targeted content to the user.

20 Claims, 4 Drawing Sheets

METHOD AND APPARATUS FOR TARGETED CONTENT DELIVERY BASED ON INTERNET VIDEO TRAFFIC ANALYSIS

BACKGROUND OF THE INVENTION

1. Field of the Invention

This invention relates generally to the dissemination of targeted information through communications networks.

2. Description of Related Art

Usage of the Internet for distribution of video is increasing in popularity. Some videos are produced by mainstream studios. Other videos are generated by individual users. Both types of videos are widely available and widely consumed by Internet users.

The types of such videos consumed by any given Internet user is a valuable source of information indicative of interests and behavior of the user. Accordingly, it would be advantageous to deliver targeted content such as advertising to the user based on an analysis of Internet video traffic consumed by the user.

Unfortunately, there does not currently exist an ability to monitor and analyze Internet video traffic consumed by users for the purpose of targeted content delivery. Accordingly, various exemplary embodiments overcome this limitation.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

Deep packet inspection (DPI) technology is deployed by carriers in current embodiments to monitor Internet traffic for the purposes of traffic control and engineering. Some current embodiments utilize DPI for the purposes of targeted content delivery. One type of targeted content includes advertisements.

In various exemplary embodiments, the DPI function is extended to monitor and process metadata associated with Internet video streams. In various exemplary embodiments, this information is then used to infer and formulate a user demographic and/or behavioral profile information of the user.

Accordingly, various exemplary embodiments use a technique similar to DPI to monitor metadata associated with a video stream as it traverses a communication network. In various exemplary embodiments, once the metadata is inspected, processed and analyzed, it is then utilized in connection with forming a profile of the user. In various exemplary embodiments, the user profile is then, in turn, used to select a most suitable form of targeted content for delivery to the user.

As used herein, it should be understood, that the term "video" is used generically to refer to any form of multimedia content that contains at least a video media portion such as moving images. Accordingly, it should be apparent that, the "video" discussed herein includes, in various exemplary embodiments, an audio portion, and/or another type of media such as texts or static images. Likewise, it should be understood that the term "metadata" as used herein refers to information that accompanies and describes video content.

In light of the present need for a method and apparatus for targeted content delivery based on Internet video traffic analysis, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Accordingly, various exemplary embodiments are a system for targeted content delivery based on Internet video traffic analysis, including one or more of the following in various combinations: a packet-based communication network in communication with a terminal device, the packet-based communication network 1) collecting and comparing traffic flows between the terminal device and one or more video content sources to known protocol signatures, 2) identifying one or more matches between the traffic flows and the known protocol signatures, 3) identifying, monitoring and analyzing a flow sequence of video content information for the identified one or more matches between the traffic flows and the known protocol signatures, 4) identifying and extracting metadata associated with the video content information and included in the traffic flows, and 5) harmonizing the identified and extracted metadata into a common format; a behavior analyzer that formulates a behavioral profile of a user of the terminal device, the user of the terminal device requesting the video content information through the terminal device and receiving the requested video content information at the terminal device; and a targeted content delivery infrastructure that establishes behavioral profile data regarding the user of the terminal device and delivers targeted content to the terminal device of the user.

Various exemplary embodiments include one or more of the following in various combinations: a protocol signature identifier and the protocol signature identifier performs the collecting and comparing traffic flows between the terminal device and one or more video content sources to known protocol signatures, identifying one or more matches between the traffic flows and the known protocol signatures, and identifying, monitoring and analyzing the flow sequence of video content information for the identified one or more matches between the traffic flows and the known protocol signatures; a metadata information collector and the metadata information collector performs the identifying and extracting metadata associated with the video content information and included in the traffic flows; and a metadata pre-processor and the metadata pre-processor performs the harmonizing the identified and extracted metadata into a common format.

Various exemplary embodiments include one or more of the following in various combinations: the behavioral profile data a demographic of the user and/or a psychographic of the user and/or an interest of the user; the targeted content is an advertisement; the targeted content delivery infrastructure delivers the targeted content via the Internet, such as via Internet protocol based video or via a wireless communications network; the metadata information collector includes storage that stores the identified and extracted metadata associated with the video content information; the metadata pre-processor includes storage that stores the harmonized metadata; a behavioral profile database in which the behavioral profile of the user of the terminal device is stored; the terminal device receives the requested video content information from one or more video content sources; and the targeted content is delivered to the terminal device of the user based on the established behavioral profile data regarding the user of the terminal device.

Similarly, various exemplary embodiments are a method of targeted content delivery based on Internet video traffic analysis, including one or more of the following in various combinations: collecting relevant user traffic; comparing collected traffic flows of the relevant user traffic to a set of known protocol signatures; determining that a match exist between the collected traffic flows of the relevant user traffic and one or more members of the set known protocol signatures; identifying a flow sequence of video content information in the relevant user traffic; monitoring and analyzing the video content information; identifying metadata associated with the video content information; extracting the identified metadata; forwarding the extracted metadata; harmonizing the forwarded metadata into a common format; developing a user profile based on the harmonized metadata; and delivering targeted content based on the developed user profile.

Various exemplary embodiments include one or more of the following in various combinations: the metadata includes at least one text stream; the metadata is embedded in the video content information; and the extracted metadata is stored.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
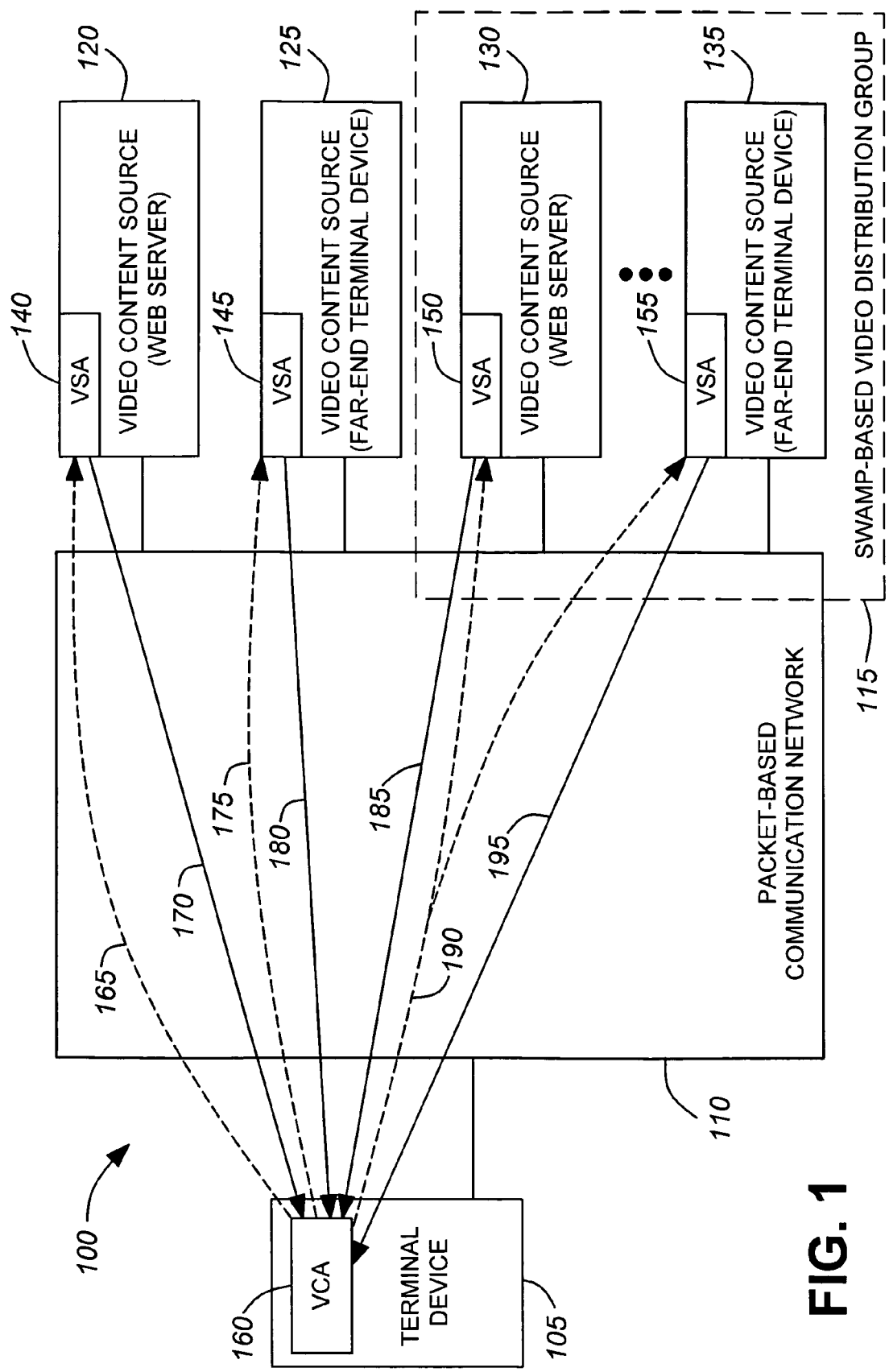
FIG. 1 is a schematic diagram of a first exemplary embodiment of a system for targeted content delivery based on Internet video traffic analysis.

Referring now to the drawings, in which like numerals refer to like components or steps, there are disclosed broad aspects of various exemplary embodiments.

FIG. 1 is a schematic diagram of a first exemplary embodiment of a system 100 for targeted content delivery based on Internet video traffic analysis. Exemplary system 100 depicts the basic communication framework between an Internet user and a content provider. Accordingly, as used herein, references to an Internet user should be understood to be references to the receiver or consumer of an Internet video. Likewise, references herein to a content provider should be understood to be references to the source or transmitter of the Internet video.

There are many ways to distribute video over the Internet. Broadly speaking, the ways to distribute video over the Internet can be categorized as streaming or download. As used herein, streaming should be understood to denote that the video content is playable or consumable almost instantaneously, or with minimal delay, typically for buffering purposes, after a content provider responds to a user request for the video. Conversely, download should be understood to denote situations where the video content is playable or consumable only after the entirety of the video content has been delivered to the user location. It should be understood that the embodiments described herein are applicable both to video streaming and downloading systems and methodologies of video content distribution.

Furthermore, video distribution is performed in certain embodiments using a traditional client-server model or a swamp-based model. Exemplary system 100 depicts both of these models. The client server model pertains to communications between a client such as an Internet user operating terminal device 105 and a web server such as video content source 120 operated by a content provider. Other examples include video distribution between two Internet users such as peer-to-peer video distribution between a user of terminal device 105 and a user of far-end terminal device 125 operating as a video content source. It should be apparent that, in various exemplary embodiments, all of the video content sources that are not part of the swamp-based video distribution group 115 are web servers. In other exemplary embodiments, all of the video content sources that are not part of the swamp-based video distribution group are far-end terminal devices. Likewise, as depicted in exemplary system 100, in various exemplary embodiments, the video content sources that are not part of the swamp-based video distribution group are a mixture of web servers and far-end terminal devices.

For the swamp-based approach to video distribution, a swamp-based video distribution group 115 includes a plurality of video content sources such as web server 130 and far-end terminal device 135. The web server 130 and far-end terminal device 135 in swamp-based video distribution group 115 also both operate as video content sources just as web server 120 and far-end terminal device 125. It should be apparent that, in various exemplary embodiments, all of the video content sources in the swamp-based video distribution group 115 are web servers. In other exemplary embodiments, all of the video content sources in the swamp-based video distribution group are far-end terminal devices. Likewise, as depicted in exemplary system 100, in various exemplary embodiments, the video content sources in the swamp-based video distribution group 115 are a mixture of web servers and far-end terminal devices.

One example of a communication protocol utilized for a swamp-based approach to video distribution is the BitTorrent protocol. In swamp-based video distribution, the video content is distributed amongst many peers including web server 130 and far-end terminal device 135. It should be understood that, in various exemplary embodiments, the swamp-based video distribution group 115 includes any number of peers. In various exemplary embodiments of the swamp-based model, fragments of the content, called blocks according to the BitTorrent protocol, are transmitted from various participating peers to the receiving client represented by terminal device 105 in exemplary system 100.

It should be apparent that the categorization of a client-server versus swamp-based distribution model is orthogonal to the streaming-download categorization. Accordingly, these differentiations have different segmentations, different perspectives and independent characterizations.

Originally the swamp-based protocol, such as BitTorrent, was designed for content downloading. However, more recently advanced swamp-based communication protocols are designed to support streaming delivery also. It should be apparent that the various exemplary embodiments described herein are applicable to both downloading and streaming forms of swamp-based communication protocols.

Dotted lines 165, 175, 190 in exemplary system 100 represent requests for video content initiated by a video client application (VCA) 160 contained within the terminal device 105. Further, it should be apparent that video content request 190 branches out within swamp-based video distribution group 115 such that it is received by each of the plurality of video serving applications 150, 155 (VSAs) within the video content source 130 and video content source 135 acting as video content sources.

Similarly, the solid lines 170, 180, 185, 195 represent delivery of video content from a VSA 140, 145, 150, 155 to VCA 160 in the terminal device 105. Further, it should be apparent that, the delivery of a single video requested by the VCA 160 occurs over both video content delivery 185 and video content delivery 195 when initiated from VSA 150 and VSA 155 within the plurality of video content sources 130, 135 contained in swamp-based video distribution group 115.

As used herein, the terminal device 105 is a customer premise based client computing device that is connected into packet-based communication network 110. In various exemplary embodiments, the packet-based communication network 110 is the Internet.

The connection between the terminal device 105 and the packet-based communication network 110 is wireless in some embodiments and fixed in other embodiments. Thus, in various exemplary embodiments, the connection between the terminal device 105 and the packet-based communication network 110 is a digital subscriber line (DSL), cable-modem based interconnection, or wireless interconnection. Accordingly, in various exemplary embodiments, the terminal device 105 is a personal computer, a mobile phone, a personal data assistant (PDA), and so on.

In various exemplary embodiments, the VCA 160 is a software function that resides within the terminal device 105. Accordingly, in various exemplary embodiments, the VCA 160 is a multimedia player. In various exemplary embodiments, the VCA 160 is a stand alone software application. In other exemplary embodiments, the VCA 160 is part of an overall application. Accordingly, in various exemplary embodiments, the VCA 160 is part of a portable game console. It should also be understood that, the VCA 160 performs many of the functions described below in connection with exemplary method 200.

In various exemplary embodiments, the packet-based communication network 110 is used to provide routing of packet flows to appropriate destinations. In this context, video streams, especially in the streaming-based model, are carried using real-time transport protocol (RTP) or real-time streaming protocol (RTSP) over user datagram protocol (UDP) over IP protocol. With reference to the Internet engineering taskforce (IETF), it should be understood that both RTP and RTSP protocols are intended for streaming media purposes.

In various exemplary embodiments, the video content sources (VCSs) 120, 125, 130, 135 are web servers that contain VSAs 140, 145, 150, 155 or far-end terminal devices that belong to another individual user of the packet-based communication network 110. Accordingly, in various exemplary embodiments, web server 120 and/or web server 130 are part of a content provider Internet portal.

Apart from the similarities between web server 120 and web server 130, and the similarities between far-end terminal device 125 and far-end terminal device 135, in the swamp-based video distribution group 115, VSA 150 and VSA 155 function to distribute content fragments according to the swamp-based content distribution protocol employed by the swamp-based video distribution group 115, such as BitTorrent.

In various exemplary embodiments, VSA 140, 145, 150, 155 are software functions embedded within the VCS 120, 125, 130, 135, respectively. In various exemplary embodiments, VSA 140, 145, 150, 155 are stand alone software applications. In various exemplary embodiments, VSA 140, 145, 150, 155 are part of an overall application.

Further, it should be apparent that, in various exemplary embodiments, VSA 140, 145, 150, 155 perform one or more of the functions described below in connection with exemplary method 200. Similarly, it should be apparent that, video content requests 165, 175, 190 and video content delivery 170, 180, 185, 195 represent one or more of the functions described below in connection with exemplary method 200. As used herein, the phrase video content information or video content information flow refers to the video content requests and video content delivery.

In connection with exemplary system 100, metadata typically flows in a single direction from the VCA 120, 125, 130, 135 to the terminal device 105. This direction is referred to herein as the server to client direction.

As defined, in various exemplary embodiments, the metadata contains information that describes the nature of the video content being transmitted. In various exemplary embodiments, the metadata is a primary source of input information which is used for the purpose of developing a profile of the user of the terminal device 105. Accordingly, metadata can be understood as being data about the data. Put differently, metadata can be understood as being data describing the actual content of a video stream. In various exemplary embodiments, the metadata is provided in the form of a text stream.

In various exemplary embodiments, metadata is delivered from the VCS 120, 125, 130, 135 to the terminal device 105 in a variety of manners. In various exemplary embodiments, no explicit request for the metadata is made by the user of the terminal device 105. However, it should be understood that, in other exemplary embodiments, the terminal device 105 does explicitly request the metadata.

Accordingly, in various exemplary embodiments, the metadata accompanies the transmission of the video content. In some exemplary embodiments, the metadata is encoded in html and delivered as part of a web page delivery. In other exemplary embodiments, the metadata is embedded in a video stream. And still other exemplary embodiments, the metadata is formatted and delivered according to a semantic web based method.

In embodiments where metadata is encoded in html and delivered as part of a web page, the metadata that describes the video is part of the content of a regular web page. Accordingly, in various exemplary embodiments, a video stream is delivered as one part of the contents from an overall web page while the related metadata is another portion of the same web page.

In embodiments where the metadata is embedded in a video stream, metadata text that describes the video is part of the overall video stream. Examples of such video formats include the current MPEG transport stream (MPEG-TS) and MPEG7/21.

In certain known compression and transport technologies, including the ones listed above, the overall stream contains many constituting sub-streams. The sub-streams are used in various exemplary embodiments to carry different media types including audio, video, referable objects within the video, captions and so on. In various exemplary embodiments, one or more such sub-streams are used to carry metadata that describes the nature of the video.

In various exemplary embodiments, the metadata is used to describe the scene of the video. In various exemplary embodiments, the video content source provider chooses the content of the metadata. Based on the foregoing, it should be apparent that, various exemplary embodiments are equally applicable to any later developed format for compressing a video stream.

In embodiments employing the semantic web based method of distributing video over the Internet, it should be understood that the semantic web is an initiative in the world wide web consortium (W3C). An objective of W3C is to come up with a standardized approach to describe generic web objects such that the descriptors are machine readable and processable.

A relevant aspect of the foregoing is the resource description framework (RDF) of the W3C. The RDF seeks to standardized ways to describe web objects such that the information is consistently processed by RDF compliant machines. The object in such embodiments is a piece of video content and the associated descriptor is a form of metadata. It should be apparent that, metadata is explicitly requested in certain such particular embodiments.

In various exemplary embodiments, the semantic web information is encoded using the XML language. A similar initiative in this area is the Dublin Core Metadata Initiative (DCMI). The DCMI is also an open standardization entity that promotes an interoperable metadata standard.

Figure 2:
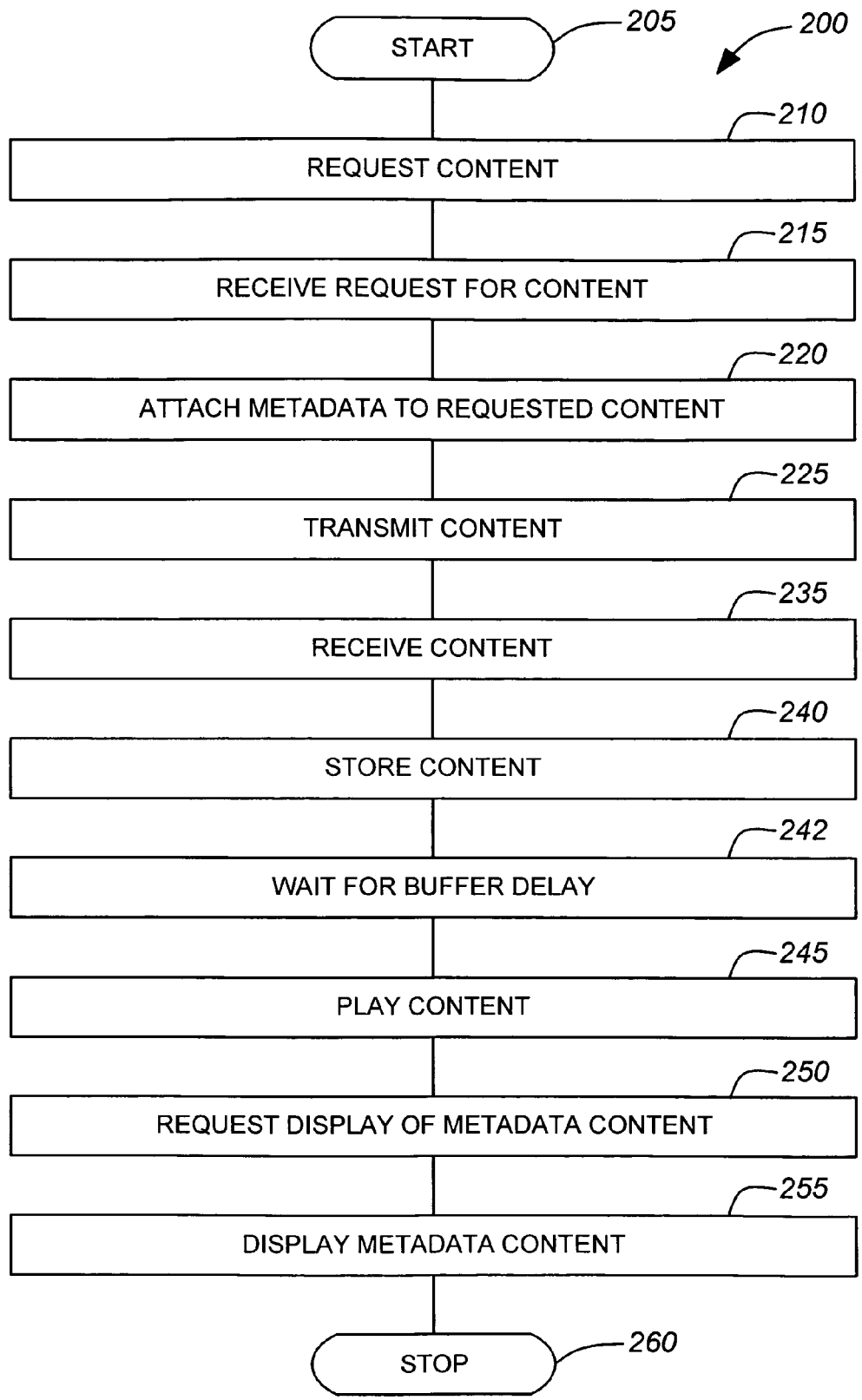
FIG. 2 is a flow chart of a first exemplary embodiment of a method for targeted content delivery based on Internet video traffic analysis.

In connection with the foregoing, FIG. 2 is a flow chart of a first exemplary embodiment of a method 200 for targeted content delivery based on Internet video traffic analysis. The method 200 starts in step 205 and continues to step 210.

In step 210, video content is requested from a serving location. As the term is used herein video content is broadly defined above. In various exemplary embodiments, the content sourcing location is a web-server, an Internet user, a distributed swamp of Internet peers, including those using the BitTorrent protocol, and so on.

In embodiments where the content requested in step 210 is a streaming video, the terminal device requesting the content is a location capable of receiving and playing video content after a suitable buffer delay. In embodiments where the requested content is to be a downloaded video, the terminal device requesting the video content in step 210 is capable of receiving and storing the video content into a memory location such as a hard drive. With either streaming or downloading video, and with either embedding or accompanying metadata, in various exemplary embodiments, the terminal device requesting the video content in step 210 is capable of displaying associated metadata, including upon a user request for such a display.

Following step 210, the method 200 proceeds to step 215. In step 215, the request for content is received. In various exemplary embodiments, the request for content is received by a VSA. Accordingly, in various exemplary embodiments, the request for content is sent by VCA 160 and received by one or more VSA 140, 145, 150, 155.

Upon receipt, in step 220, metadata is attached to the requested video content. Following step 220, the method 200 proceeds to step 225. In step 225, the requested video content, and attached metadata, are transmitted to the requesting client terminal device such as terminal device 105.

In the case of a streaming model, the video content is served in sequence in step 225. In embodiments where the video content is transmitted in step 225 as a download, the video content is transmitted as a piece of a file. It should be understood that the fragments constituting an overall file need not be delivered in sequence.

In embodiments employing a simple client-server type of delivery, the VSA 140, 145, 150, 155 needs to be able to deliver the requested content in a simple point-to-point manner. In embodiments that involve participation as part of a peer-to-peer swamp, the VSA 140, 145, 150, 155 needs to be able to deliver the content in step 225 in conformity to the established swamp-based protocol. According to the foregoing, it should be apparent that the content is transmitted in step 225 according to a variety of approaches as discussed elsewhere herein.

After receiving the content in step 235, in various exemplary embodiments, the content is stored by the terminal device 105 in step 240. In step 242, the requesting client terminal device 105 waits for the establishment of a buffer delay of a video stream. In various exemplary embodiments, the content is then played by the terminal device 105 in step 245.

Also, as discussed above, in various exemplary embodiments, a request is made to display the metadata content in step 250. Accordingly, following a request to display the metadata content in step 250, the metadata content is displayed in step 255. Following step 255, the method 200 proceeds to step 260 where the method 200 stops.

Figure 3:
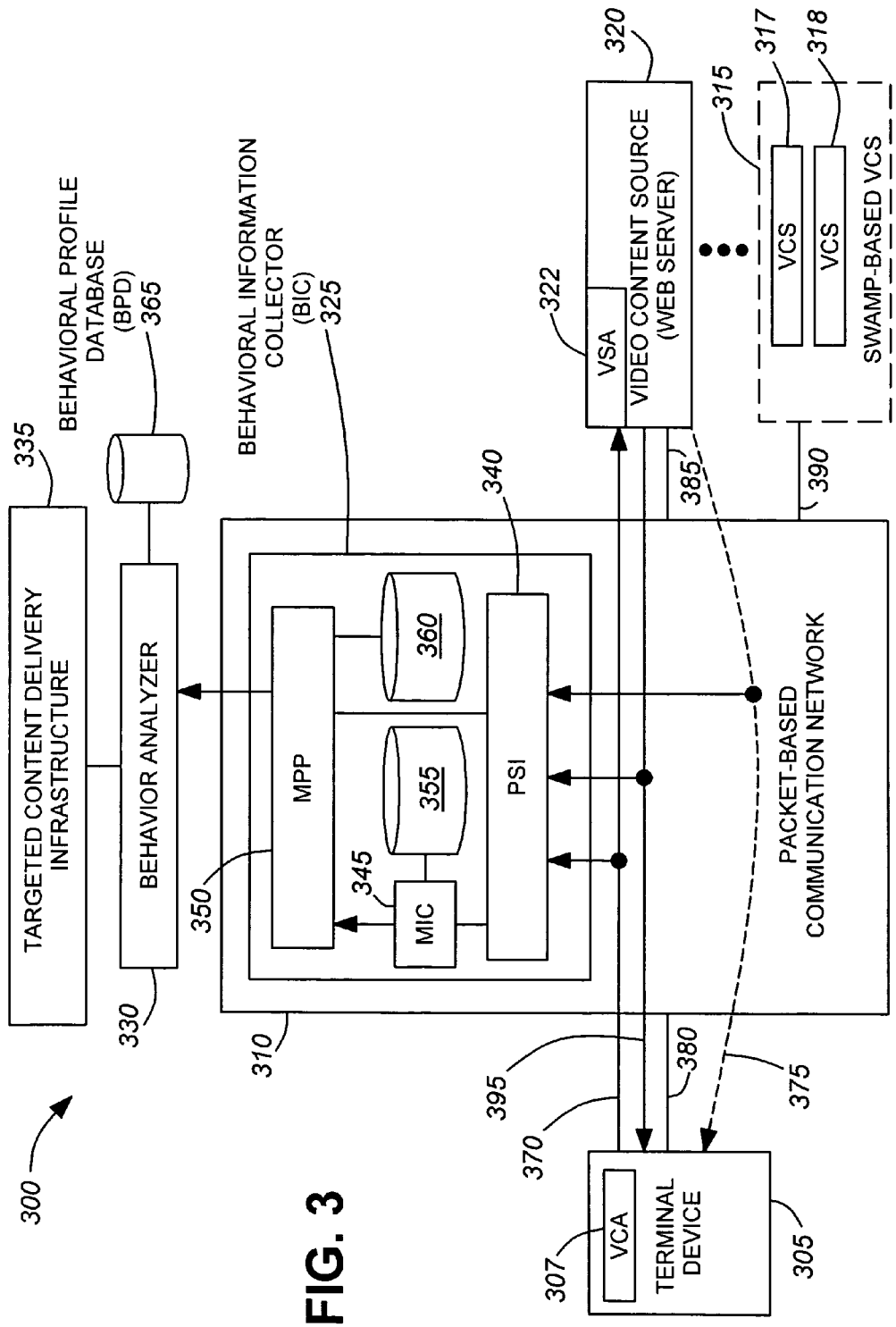
FIG. 3 is a schematic diagram of a second exemplary embodiment of a system for targeted content delivery based on Internet video traffic analysis.

FIG. 3 is a schematic diagram of a second exemplary embodiment of a system 300 for targeted content delivery based on Internet video traffic analysis. Several similarities exist between exemplary system 300 and exemplary system 100. Accordingly, descriptions provided above in connection with several elements depicted in exemplary system 100 should be understood to apply to corresponding elements depicted in exemplary system 300.

In particular, terminal device 305 and VCA 307 correspond to terminal device 105 and VCA 160. Likewise, swamp based VCS 315, including VCS 317 and VCS 318, corresponds to swamp-based video distribution group 115 with VCS 130 and VCS 135.

VCS 320 corresponds to VCS 120. Accordingly VSA 322 corresponds to VSA 140. Packet-based communication network 310 corresponds to packet-based communication network 110.

Terminal device 305 communicates with packet-based communication network 310 by way of communication path 380. VCS 320 communicates with packet-based communication network 310 by way of communication path 385. Swamp-based VCS 315 communicates with packet-based communication network 310 by way of communication path 390.

The packet-based communication network 310 includes a behavioral information collector (BIC) 325. In various exemplary embodiments, the BIC 325 monitors and collects relevant user traffic for the purpose of further profiling.

In various exemplary embodiments, the BIC 325 is deployed inline. In other exemplary embodiments, the BIC 325 is deployed off line in an adjunct manner with respect to the communication traffic. It is believed that embodiments where the BIC 325 is deployed offline with respect to the communication traffic improves the likelihood of network survivability.

In various exemplary embodiments, the BIC 325 utilizes deep packet inspection (DPI) technology. In other exemplary embodiments, the BIC 325 is part of a DPI platform.

The BIC 325 includes a protocol signature identifier (PSI) 340, a metadata information collector (MIC) 345 having an MIC database 355, and a metadata pre-processor (MPP) 350 including MPP database 360. Video content request 370 is made from terminal device 305 to VSA 322 of VCS 320.

Video content delivery 395 is returned from VCS 320 to terminal device 305 in response to video content request 370.

Metadata flow 375 is also sent from VCS 320 to terminal device 305. Additional details regarding video content request 370, video content delivery 395 and metadata flow 375 are contained elsewhere herein.

PSI 340 is tapped into video content request 370, video content delivery 395 and metadata flow 375. In connection therewith, PSI 340 monitors and matches the inline traffic flow against a set of known protocol signatures. In connection therewith, PSI 340 identifies various protocols. Accordingly, in various exemplary embodiments, PSI 340 identifies the flow sequence of the video content information exchanged between VCA 307 and VSA 322 (or, more broadly, between terminal device 305 and VCS 320).

Accordingly, PSI 340 identifies a protocol signature of the video content request 370 and of the video content delivery 395 to signify a particular video content flow. Further, in various exemplary embodiments, the PSI 340 is capable of recognizing if a video content flow is a streaming flow or a download of video content. Likewise, in various exemplary embodiments, the PSI 340 is able to recognize whether the video content request 370 and resulting video content delivery 395 are of a point-to-point or swamp-based type.

In various exemplary embodiments, as part of the overall protocol identification process, the PSI 340 monitors and extracts raw metadata text streams from metadata flow 375. As discussed elsewhere herein, the raw metadata text streams monitored and extracted by PSI 340 are associated with the video content flow of video content delivery 395 from the online traffic. In various exemplary embodiments, the PSI 340 forwards the extracted raw metadata to MIC 345 for further processing.

In various exemplary embodiments, MIC 345 collects the various types of metadata associated with the video content received from the PSI 340. In various exemplary embodiments, when operating on the extracted metadata, MIC 345 uses a heuristic process to identify the metadata flow and to identify the underlying type of methodology for carrying the metadata.

In embodiments where metadata is html text, MIC 345 includes an html parsing function able to analyze the traversing html code of a web page in which the video was delivered. Accordingly, MIC 345 extracts the embedded metadata associated with the video. In various exemplary embodiments, MIC 345 stores the extracted metadata in MIC database 355.

In embodiments where metadata is contained within a compressed video stream, MIC 345 includes a video uncompression function in which the component sub-streams of the compressed video are identified and decomposed or demultiplexed. Accordingly, in such embodiments, any metadata contained within a sub-stream is extracted by MIC 345. Further, in various exemplary embodiments, such extracted metadata is stored in MIC database 355.

In embodiments employing a semantic web style of metadata association, MIC 345 includes an XML parsing and analyzing function that is capable of processing a semantic web compliant document. In various exemplary embodiments, such a document is, for example, an RDF compliant or DCMI compliant XML document with the associated definition syntax. In such exemplary embodiments, MIC 345 parses the document associated with the video content and extracts descriptive fields that contain the metadata of interest.

In various exemplary embodiments, the extracted metadata is then stored in MIC database 355. In connection with this discussion, it should be apparent that, in various exemplary embodiments, the metadata is a single text stream, and in other exemplary embodiments the metadata is a multiple text stream.

In practice, there is no standard in metadata creation. Put differently, what and how information is described in metadata varies. On one extreme, a content provider might give nothing more than a superficial description of the video content such as a genre or nature of the video content in accompanying metadata. Other content providers may include, for example, a short synopsis sentence and/or information related to a lead actor, a lead actress, a director, a production company, and so on, as part of the metadata accompanying the video stream.

At another extreme, the content provider chooses to embed metadata scene by scene. In such embodiments, the metadata may be temporally synchronized to actual video images. It should be apparent that any currently known, or later developed, methodology for embedding video metadata are employed to achieve the functions described herein.

In various exemplary embodiments, the MPP 350 harmonizes or unifies various forms of metadata into a common format, including performing a formatting conversion if necessary. In various exemplary embodiments, the harmonized or unified formatted metadata is then conveyed to behavior analyzer 330. In various exemplary embodiments, the behavior analyzer 330 then utilizes the harmonized metadata from MPP 350 in connection with formulating a profile of a user.

In various exemplary embodiments, the common format given to metadata by MPP 350 for transmission to behavior analyzer 330 is defined as a form of schema or a hierarchy of class structure. Examples of a form of schema include those containing a year, a genre, a rating, a production house, a lead actor, a lead actress, a suitable audience, and so on. In various exemplary embodiments, the harmonization process within MPP 350 utilizes a text parser and a textual analyzer. These are collectively referred to as a textual processing engine.

In various exemplary embodiments, using a heuristic process, the metadata stored in MIC database 355 is extracted and processed by the MPP 350 textual processing engine. In various exemplary embodiments, key words that suit a defined scheme definition are further extracted and entered into a field of the schema structure. In various exemplary embodiments, the schema structure is kept and maintained as a stored database.

Using the previous example, in various exemplary embodiments, a metadata text stream that contains the word drama would be textually analyzed and recognized as a type of genre by MPP 350. Accordingly, in this example, the word drama would be extracted and stored under the genre field of the schema.

In various exemplary embodiments, as an option, the textual processing engine of MPP 350 contains a belief system function typical to the field of predictive analytics. In such exemplary embodiments, the belief system assigns a weight to a key word that reflects how strong, that is, a belief of likelihood, that the key word is actually associated with a given field of the schema.

For example, the key word Bond is understood to be a reference to a James Bond movie. Accordingly, the key word Bond is understood to reflect an action genre of content, and also as being part of a character's name.

In various exemplary embodiments, a system for estimating the degree of likelihood, such as the Bayesian system, is implemented as a type of belief system. Accordingly, various exemplary embodiments assign a mentioned belief weight to an extracted key word. Further, it should be understood that, in various exemplary embodiments, MPP 350 is integrated as part of the behavior analyzer 330.

In various exemplary embodiments, the behavior analyzer 330 formulates a user behavior profile based on the collected behavior information. In various exemplary embodiments, such a set of information includes the data collected in MPP 350. In various exemplary embodiments, the behavior analyzer 330 uses this information to infer, formulate and reinforce a view of demographic, psychographic and/or relevant interests of a user of the terminal device 305.

In various exemplary embodiments, the information captured by MPP 350 is stored in MPP database 360. In various exemplary embodiments, this information is retrieved by the behavior analyzer 330 through the MPP 350. Accordingly, the operations of MPP 350 on this information can be understood as pre-processing and capturing the information.

In various exemplary embodiments, such content related metadata information is further utilized by the behavior analyzer 330 to infer the user profile. Accordingly, this information is relevant in various exemplary embodiments to forming a demographic and psychographic portion of the user profile.

In various exemplary embodiments, the targeted content delivery infrastructure 335 utilizes the established user profile data and delivers highly relevant and personalized content to end users of the terminal device 305. Accordingly, in various exemplary embodiments, the targeted content delivery infrastructure 335 matches a most suitable product recommendation or advertisement against mentioned demographic, psychographic and other relevant interest data contained within the behavioral profile database (BPD) 365. In various exemplary embodiments, the personalized content such as an advertisement is delivered by way of a partner web publisher portal or other targeted means including mobile or other wireless communications and Internet protocol video distribution such as Internet protocol television (IPTV).

In various exemplary embodiments, the subject matter described herein is used in conjunction with other collected data such as web site click stream data showing a sequence of web sites navigated to by a user to formulate the user profile. The various components described above are used to perform the functions described below in connection with exemplary method 400.

Figure 4:
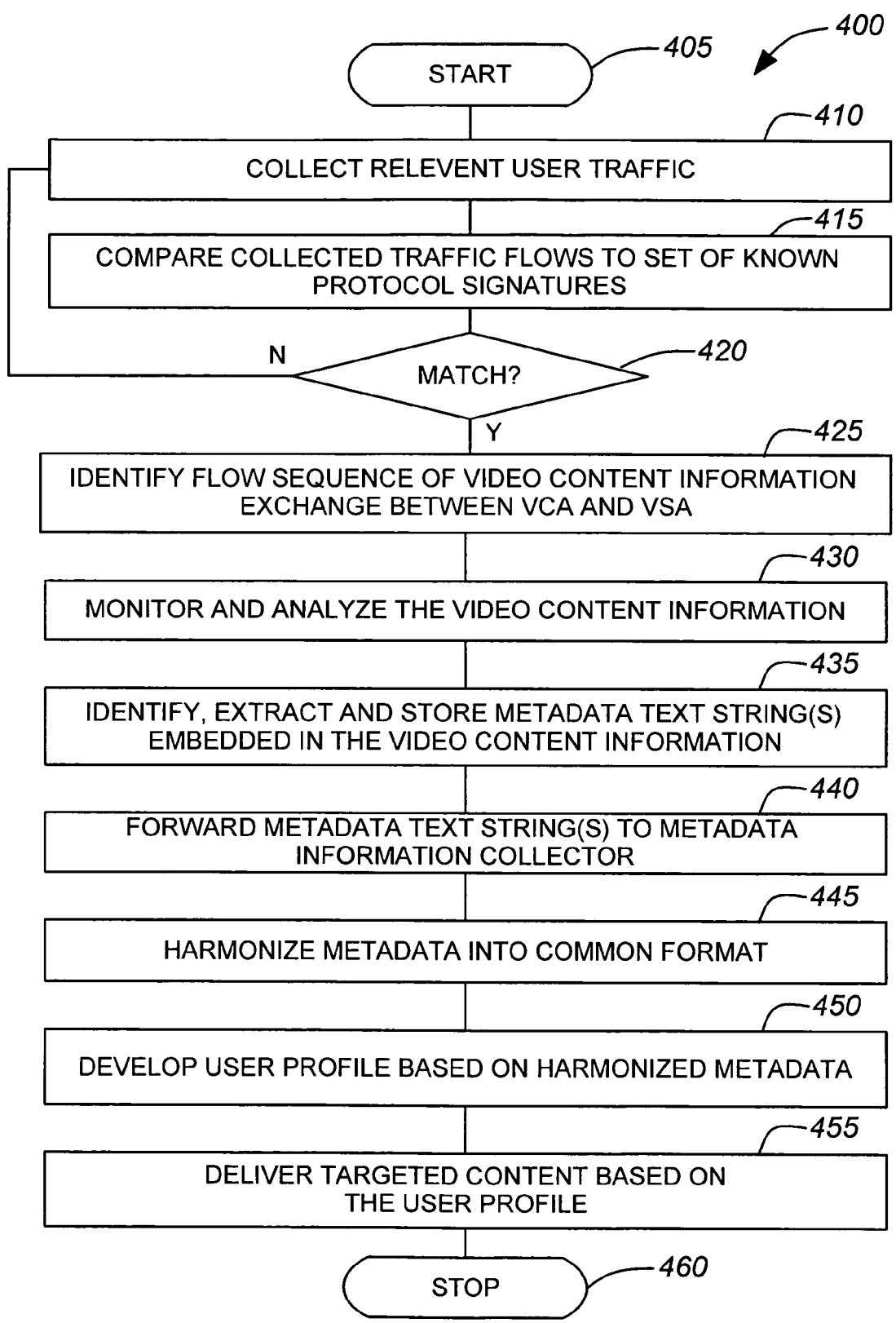
FIG. 4 is a flow chart of a second exemplary embodiment of a method for targeted content delivery based on Internet video traffic analysis.

FIG. 4 depicts a flow chart of an exemplary method 400 for targeted content delivery based on Internet video traffic analysis. The method 400 starts in step 405 and proceeds to step 410.

In step 410, relevant user traffic is collected. The method 400 then proceeds to step 415. In step 415, collected traffic flows are compared to a set of known protocol signatures. Following step 415, the method 400 proceeds to step 420.

In step 420 a determination is made whether a match exists between the collected traffic flows and any member of the set of known protocol signatures. When a determination is made in step 420 that no match exists between the collected traffic flows and any member of the set of known protocol signatures, the method 400 returns to step 410 where the collection of relevant user traffic continues.

When a determination is made in step 420 that a match does exist between collected traffic flows and one or more members of the set of known protocol signatures, the method 400 proceeds to step 425. In step 425, the flow sequence of video content information exchanged between the VCA 160, 307 and the VSA 140, 145, 150, 155, 322 is identified.

Following step 425, the method 400 proceeds to step 430. In step 430 the video content information is monitored and analyzed.

Following step 430, the method 400 proceeds to step 435. In step 435 the metadata text streams embedded in the video content information, which may be a single stream, are identified extracted and stored. Following step 435, the method 400 proceeds to step 440.

In step 440, the one or more metadata text streams identified, extracted and stored in step 435 are forwarded to a metadata information collector. It should be understood that, the steps of identifying extracting and storing in step 435 and forwarding in step 440 are performed in parallel for plural metadata in various exemplary embodiments.

Following step 440, the method 400 proceeds to step 445. In step 445, the metadata is harmonized or unified into a common format. This, and other aspects of method 400, are discussed further above in connection with various components of system 100 and system 300.

Following step 445, the method 400 proceeds to step 450. In step 450, a user profile is developed based on the harmonized or unified metadata.

Following step 450, the method 400 proceeds to step 455. In step 455, targeted content is delivered to a user based on the developed user profile. Following step 455, the method 400 proceeds to step 460 where the method 400 stops.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A system for targeted content delivery based on Internet video traffic analysis, comprising:
   a packet-based communication network in communication with a terminal device, the packet-based communication network using deep packet inspection (DPI) technology in a metadata information collector to identify and extract metadata associated with video content information and included in traffic flows, collecting and comparing traffic flows between the terminal device and one or more video content sources to known protocol signatures, identifying one or more matches between the traffic flows and the known protocol signatures, identifying, monitoring and analyzing a flow sequence of video content information for the identified one or more matches between the traffic flows and the known protocol signatures, identifying and extracting metadata associated with the video content information and included in the traffic flows, and harmonizing the identified and extracted metadata into a common format, wherein the common format is a hierarchy of class structure;
   a behavior analyzer that formulates a behavioral profile of a user of the terminal device, the user of the terminal device requesting the video content information through the terminal device and receiving the requested video content information at the terminal device; and
   a targeted content delivery infrastructure that establishes behavioral profile data regarding the user of the terminal device and delivers targeted content to the terminal device of the user.

2. A system for targeted content delivery based on Internet video traffic analysis, comprising:

a packet-based communication network in communication with a terminal device, the packet-based communication network using deep packet inspection (DPI) technology in a metadata information collector to identify and extract metadata associated with video content information and included in traffic flows, collecting and comparing traffic flows between the terminal device and one or more video content sources to known protocol signatures, identifying one or more matches between the traffic flows and the known protocol signatures, identifying, monitoring and analyzing a flow sequence of video content information for the identified one or more matches between the traffic flows and the known protocol signatures, identifying and extracting metadata associated with the video content information and included in the traffic flows, and harmonizing the identified and extracted metadata into a common format;

a behavior analyzer that formulates a behavioral profile of a user of the terminal device, the user of the terminal device requesting the video content information through the terminal device and receiving the requested video content information at the terminal device; and a targeted content delivery infrastructure that establishes behavioral profile data regarding the user of the terminal device and delivers targeted content to the terminal device of the user, wherein the packet-based communication network further comprises a protocol signature identifier that performs the collecting and comparing traffic flows between the terminal device and one or more video content sources to known protocol signatures, the identifying one or more matches between the traffic flows and the known protocol signatures, and the identifying, monitoring and analyzing the flow sequence of video content information for the identified one or more matches between the traffic flows and the known protocol signatures.

3. The system for targeted content delivery based on Internet video traffic analysis, according to claim 1, wherein the packet-based communication network further comprises:

a metadata pre-processor that performs the harmonizing of the identified and extracted metadata into the common format.

4. The system for targeted content delivery based on Internet video traffic analysis, according to claim 1, wherein the behavioral profile data includes information selected from the list consisting of a demographic of the user and a psychographic of the user.

5. The system for targeted content delivery based on Internet video traffic analysis, according to claim 1, wherein the behavioral profile data includes an interest of the user.

6. The system for targeted content delivery based on Internet video traffic analysis, according to claim 1, wherein the targeted content is an advertisement.

7. The system for targeted content delivery based on Internet video traffic analysis, according to claim 1, wherein the targeted content delivery infrastructure delivers the targeted content via the Internet.

8. The system for targeted content delivery based on Internet video traffic analysis, according to claim 1, wherein the targeted content is delivered via Internet protocol based video.

9. The system for targeted content delivery based on Internet video traffic analysis, according to claim 1, wherein the targeted content is delivered via a wireless communications network.

10. The system for targeted content delivery based on Internet video traffic analysis, according to claim 1, wherein the metadata information collector includes storage that stores the identified and extracted metadata associated with the video content information.

11. The system for targeted content delivery based on Internet video traffic analysis, according to claim 3, wherein the metadata pre-processor includes storage that stores the harmonized metadata.

12. The system for targeted content delivery based on Internet video traffic analysis, according to claim 1, further comprising:

a behavioral profile database in which the behavioral profile of the user of the terminal device is stored.

13. The system for targeted content delivery based on Internet video traffic analysis, according to claim 1, wherein the terminal device receives the requested video content information from one or more video content sources.

14. The system for targeted content delivery based on Internet video traffic analysis, according to claim 1, wherein the targeted content is delivered to the terminal device of the user based on the established behavioral profile data regarding the user of the terminal device.

15. A method of targeted content delivery in a packet-based communication network in communication with a terminal device based on Internet video traffic analysis, comprising:

collecting, with a protocol signature identifier, relevant user traffic in the packet-based communication network;

comparing, with the protocol signature identifier, collected traffic flows of the relevant user traffic to a set of known protocol signatures;

determining that a match exists between the collected traffic flows of the relevant user traffic and one or more members of the set known protocol signatures;

identifying a flow sequence of video content information in the relevant user traffic;

monitoring and analyzing the video content information;

using deep packet inspection (DPI) technology in a metadata information collector to identify and extract metadata associated with the video content information in the packet-based communication network;

forwarding the extracted metadata;

harmonizing the forwarded metadata into a common format, wherein the common format is a hierarchy of class structure;

developing a user profile based on the harmonized metadata; and delivering targeted content based on the developed user profile.

16. The method of targeted content delivery based on Internet video traffic analysis, according to claim 15, wherein the metadata is text.

17. The method of targeted content delivery based on Internet video traffic analysis, according to claim 15, wherein the metadata is embedded in the video content information.

18. The method of targeted content delivery based on Internet video traffic analysis, according to claim 15, further comprising:

storing the metadata extracted from the packet-based communication network.

19. The system of claim 1, further comprising:

a metadata information collector (MIC) database that stores the extracted metadata.

20. The method of claim 15, further comprising:

using a metadata information collector (MIC) database to store the extracted metadata.

* * * * *